United States Patent
Chen et al.

(10) Patent No.: US 9,574,053 B2
(45) Date of Patent: *Feb. 21, 2017

(54) ALKALI-SOLUBLE RESIN (ASR) SHELL EPOXY RDP WITH DIVALENT METAL IONS EXHIBITING IMPROVED POWDER REDISPERSIBILITY

(71) Applicants: Dow Global Technologies LLC, Midland, MI (US); Rohm and Haas Company, Philadelphia, PA (US)

(72) Inventors: Liang Chen, Midland, MI (US); Mark D. Westmeyer, Collegeville, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/414,265

(22) PCT Filed: Jul. 10, 2013

(86) PCT No.: PCT/US2013/049858
§ 371 (c)(1),
(2) Date: Jan. 12, 2015

(87) PCT Pub. No.: WO2014/011730
PCT Pub. Date: Jan. 16, 2014

(65) Prior Publication Data
US 2015/0175753 A1    Jun. 25, 2015

Related U.S. Application Data

(60) Provisional application No. 61/670,820, filed on Jul. 12, 2012.

(51) Int. Cl.
| | | |
|---|---|---|
| *C08J 3/12* | (2006.01) | |
| *C04B 24/28* | (2006.01) | |
| *C08K 3/24* | (2006.01) | |
| *C08K 3/16* | (2006.01) | |
| *C08L 63/00* | (2006.01) | |
| *C04B 20/12* | (2006.01) | |
| *C04B 28/02* | (2006.01) | |
| *C04B 20/10* | (2006.01) | |
| *C04B 24/26* | (2006.01) | |
| *C04B 103/00* | (2006.01) | |

(52) U.S. Cl.
CPC ............ *C08J 3/126* (2013.01); *C04B 20/1033* (2013.01); *C04B 20/12* (2013.01); *C04B 24/2641* (2013.01); *C04B 24/281* (2013.01); *C04B 28/02* (2013.01); *C08K 3/16* (2013.01); *C08K 3/24* (2013.01); *C08L 63/00* (2013.01); *C04B 2103/0054* (2013.01); *C04B 2103/0057* (2013.01); *C04B 2103/0058* (2013.01); *C04B 2103/0065* (2013.01); *C08J 2363/00* (2013.01); *C08J 2433/02* (2013.01)

(58) Field of Classification Search
None
See application file for complete search history.

(56) References Cited

U.S. PATENT DOCUMENTS

| | | | | |
|---|---|---|---|---|
| 4,028,294 A | * | 6/1977 | Brown | C08F 283/10 523/402 |
| 4,123,403 A | | 10/1978 | Warner et al. | |
| 4,308,185 A | * | 12/1981 | Evans | C08F 283/10 428/418 |
| 4,876,313 A | | 10/1989 | Lorah | |
| 5,539,021 A | | 7/1996 | Pate et al. | |
| 5,686,511 A | * | 11/1997 | Bobo | C09D 163/00 523/412 |
| 5,830,952 A | * | 11/1998 | Pedersen | C08F 283/10 523/423 |
| 5,981,627 A | | 11/1999 | Shih et al. | |
| 6,204,310 B1 | | 3/2001 | Choudhery | |
| 6,346,353 B1 | * | 2/2002 | Wang | B41M 5/506 347/105 |
| 6,534,177 B2 | | 3/2003 | Kohlhammer et al. | |
| 9,200,155 B2 | * | 12/2015 | Chen | C08L 63/00 |
| 2001/0024644 A1 | | 9/2001 | Kohlhammer et al. | |
| 2010/0190888 A1 | * | 7/2010 | Gaeberlein | C04B 24/2688 524/5 |
| 2010/0197831 A1 | | 8/2010 | Faatz et al. | |

FOREIGN PATENT DOCUMENTS

| | | |
|---|---|---|
| JP | H07166031 A | 6/1995 |
| WO | 2012177448 A1 | 12/2012 |

\* cited by examiner

*Primary Examiner* — Vickey Nerangis
(74) *Attorney, Agent, or Firm* — Andrew Merriam

(57) ABSTRACT

The present invention provides multilayer polymer redispersible powder (RDP) particles comprising a major proportion of from 50 to 90 wt. %, preferably, from 60 to 85 wt. %, based on total polymer solids, of epoxy resin resins having a calculated glass transition temperature (Tg) of from 0 to 40° C., a methacrylic acid containing alkali soluble polymer outer layer, and a divalent metal, such as zinc powder, having an aqueous pKa of 9.55 or more, or its acid salt having a pH of 7.0 or less, such as strong acid salts, e.g., chlorides, sulfates or phosphates, or organic acid salts, e.g., acetates, succinates and citrates, as well as to methods of making the same.

11 Claims, No Drawings

ALKALI-SOLUBLE RESIN (ASR) SHELL EPOXY RDP WITH DIVALENT METAL IONS EXHIBITING IMPROVED POWDER REDISPERSIBILITY

The present invention relates to multilayer polymer particle redispersible polymer powders (RDP) comprising an epoxy resin layer and an outer layer of an alkali soluble polymer and having excellent redispersibility in a cement composition. More particularly, it relates to multilayer polymer particles comprising a major proportion of epoxy resins, a methacrylic acid containing alkali soluble polymer outer layer and a divalent metal or salt additive having a high pKa and low pH, as well as to methods of making the same.

RDPs prepared from emulsion polymers have been widely used in cement or hydraulic binder construction applications, e.g., cement containing tile adhesives, SLFC (self level flooring compounds) to improve mechanical properties of the cement or binder. In such applications RDPs comprising crosslinkable polymers have been used to improve chemical and stain resistance and reduce water permeation. For example, epoxy resins are used in the repair of concrete and cement mortars to impart toughness, reduced water permeability, rapid setting, and chemical and stain resistance.

Many epoxy-modified cement products are currently available in the market. A liquid epoxy dispersion and hardener may be admixed with the cement(s) as a dry powder in a three-part system; however, complicated use requirements e.g., order of mixing, short pot-life, and equipment contamination have limited use of the products to use only by professional contractors. An RDP epoxy would be easier to use than the three-part system. One possible approach would be to incorporate epoxy functional groups into emulsion polymers, however, this method results only in a low epoxy content; in addition, the epoxy functional addition polymerizable monomers, such as, glycidyl methacrylate (GMA) cost far more than conventional epoxy resins. Thus, at present, there are no epoxy RDP products commercially available.

Recently, an epoxy RDP has been made by methods comprising mechanically dispersing a Low MW solid bisphenol-A epoxy resin or liquid epoxy resin or from epoxy resin blends having a glass transition temperature (Tg) of <40° C., including PVOH as a primary dispersant in combination with a co-dispersant, to prepare aqueous epoxy resin dispersions, followed by using the epoxy dispersion to seed emulsion polymerization of acrylic monomers to introduce a high Tg acrylic shell onto the epoxy particles. Finally, the resultant dispersion was spray dried into epoxy powders that show 100% redispersibility in aqueous alkali (NaOH). The resulting epoxy resin can be cured at high pH condition without amine hardener because the acrylic shell can be dissolved to trigger the curing reaction of epoxy resin in an alkaline environment. Nevertheless, a key challenge for such an epoxy RDP is that it can exhibit an unacceptably low redispersibility in a cement environment where there are many multivalent cations.

The present inventors have sought to solve the problem of achieving full redispersibility of an epoxy RDP powder in a cement environment.

STATEMENT OF THE INVENTION

1. In accordance with the present invention, redispersible polymer powders comprise multilayer polymer particles of from 50 to 90 wt. %, preferably, from 60 to 85 wt. %, based on total polymer solids, of epoxy resin compositions, preferably a blend of two epoxy resins, having a calculated glass transition temperature (Tg) of from 0 to 40° C., preferably from 5 to 35° C., or, more preferably, 10 to 35° C., and from 10 to 50 wt. %, based on polymer solids, of an alkali soluble polymer shell around the epoxy resin, which polymer shell is the copolymerized product of from 5 to 50 wt. %, preferably 10 to 40 wt. % of methacrylic acid or its anhydride, based on the total weight of monomers copolymerized to form the polymer shell and the remainder of one or more ethylenically unsaturated comonomer, and a divalent metal ion ($M^{2+}$) having a pKa (in water) of 9.55 or more and up to 30, preferably, 9.59 or more, or its strong acid (acid pKa≤3.5) or organic acid salt, preferably, a strong acid salt having a pH in water at a concentration of 1 wt. % of 7.0 or less, wherein the molar ratio of $M^{2+}$ ions to the carboxyl acid groups in the alkali soluble resin shell is from 10 to 200 mole %, preferably, from 25 to 100 mole %.

2. In item 1, above, the redispersible polymer powders further comprise from 3 to 25 wt. %, preferably, from 5 wt. % to 15 wt. %, of one or more colloidal stabilizer, based on total epoxy resin, alkali soluble polymer and colloidal stabilizer solids. Preferably, in item 1, above, the colloidal stabilizer is chosen from polyvinyl alcohol or poly(vinyl pyrrolidinone).

3. Preferably, in any of items 1 or 2, above, the alkali soluble polymer that comprises the polymer shell of the multilayer polymer particle has a calculated Tg of 60° C. or higher, and up to 150° C., preferably from 80° C. to 120° C.

4. Preferably, the alkali soluble polymer of the multilayer polymer particle in any of items 1, 2 or 3 has a weight average molecular weight of from 2.5 to 500 kg/mol, preferably, from 5 to 100 kg/mol.

5. The present invention also comprises aqueous dispersions comprising any of the redispersible polymer powders of any of items 1, 2, 3, or 4, above, and an aqueous medium, wherein the pH of the additive in water at a concentration of 1 wt. % is 7.0 or less, or, preferably, 6.0 or less, or, more preferably, 5.5 or less.

6. The present invention further comprises compositions comprising cement or hydraulic binder and the redispersible polymer powder composition as claimed in any one of items 1 to 5, above.

7. In another aspect, the present invention comprises methods for making the water dispersible epoxy multilayer polymer particle powders of any of items 1, 2, 3, 4, 5, or 6 above, comprising, mechanically dispersing an epoxy resin in an aqueous medium to form an initial aqueous epoxy resin dispersion; charging the initial aqueous epoxy resin dispersion into a reaction vessel; providing in the reaction vessel an ethylenically unsaturated monomer mixture, such as a monomer emulsion, comprising (i) from 5 to 50 wt. %, preferably 10 to 40 wt. %, of methacrylic acid or its anhydride, based on the total weight of ethylenically unsaturated monomers copolymerized to form the polymer shell, and (ii) the remainder of one or more copolymerizable ethylenically unsaturated monomers and one or more addition polymerization catalyst, such as, for example, a free radical initiator or redox catalyst, and copolymerizing the monomer mixture in the presence of the initial aqueous epoxy resin dispersion to form an aqueous multilayer polymer particle dispersion; adding an additive chosen from a divalent metal ion ($M^{2+}$) having a pKa (in water) of 9.55 or higher and up to 30, or, preferably, 9.59 or higher, and its strong acid (acid pKa≤3.5) or organic acid salt having a pH in water of 7.0 or less to the aqueous multilayer polymer particle dispersion; and removing the aqueous phase from the resulting multilayer polymer to obtain a water redispersible epoxy polymer powder having an alkali soluble polymer shell, wherein the amounts of epoxy resin, unsaturated monomers colloidal stabilizer are selected so that the resulting water redispersible epoxy polymer powder has from 50 to 90 wt. %, preferably 60 to 85 wt. %, of epoxy resin and from 10 to 50 wt. %, preferably from 15 to 35 wt. % of alkali soluble polymer, based on total polymer solids. Preferably, the method further comprises adding of one or more colloidal stabilizer to the epoxy resin or dispersion at one or more point before removing the aqueous phase, in a total amount of from 3 to 25 wt. %, or, preferably, from 5 to 15 wt. %, based on total epoxy resin, alkali soluble polymer and colloidal stabilizer solids.

8. Preferably, the ethylenically unsaturated monomer mixture in the process of item 7, above, is added by gradual addition to the reaction vessel containing the initial aqueous epoxy resin dispersion; however, some or all of the monomer mixture can be combined with the aqueous medium comprising epoxy resin or with the initial aqueous epoxy resin dispersion at any time prior to or during copolymerizing.

9. In the process of any of items 7 or 8, above, preferably, the unsaturated monomer mixture is selected so that the resulting alkali soluble polymer has a calculated glass transition temperature (calculated Tg) of 60° C. or higher, and up to 150° C., or, preferably, from 80° C. to 120° C.

Unless otherwise indicated, all temperature and pressure units are room temperature and standard pressure (STP). All ranges recited are inclusive and combinable. For example, a stated range of a calculated Tg of 60° C. or higher and up to 150° C., preferably, from 80° C. to 120° C. includes all of 60 to 150° C., 80 to 150° C., 120 to 150° C., 60 to 120° C., 60 to 80° C. and 80 to 120° C.

All phrases comprising parentheses denote either or both of the included parenthetical matter and its absence. For example, the phrase "filler(s)" includes, in the alternative, one filler and two or more fillers.

As used herein, the term "aqueous" means water or a mixture of water and up to 50 wt. % preferably, up to 10 wt. %, or, more preferably, 5 wt. % or less of water miscible solvent(s), based on the total weight of water and the one or more solvent.

As used herein, unless otherwise indicated, the phrase "average particle size" means volume-average particle size diffraction according to ISO 13320-2009 (International Organization for Standardization, Geneva, Switzerland) using a Coulter Counter particle size count analyzers. The particle size distribution was measured using a Coulter™ LS 13-320 laser diffraction particle size analyzer (Beckman Coulter, Brea, Calif.) per manufacturer's recommended procedures via laser scattering. The scattering light from particles through laser scattering and polarization intensity differential scattering is collected as a function of angle, and subsequently converted to a particle size distribution.

As used herein, unless otherwise indicated, the term "based on polymer solids" means the epoxy resin composition and the alkali soluble polymer when referring to the multilayer polymer particle.

As used herein, the term "calculated Tg" refers to the glass transition temperature of a (co)polymer as determined by the Fox equation, using temperature values in degrees Kelvin:

$$1/(Tg_{copolymer}) = \Sigma(wf_i/Tg_i)$$

where $Tg_{copolymer}$ is the Tg of the copolymer, $wf_i$ is the weight-fraction of monomer "i" in the (co)polymer and $Tg_i$ is the glass transition temperature of a homopolymer made from monomer "i" and the summation is over all monomers "i".

As used herein, the term "epoxy glass transition temperature (Tg)" or "epoxy resin calculated glass transition temperature (calculated Tg)" for a blend of epoxy resins is determined by the epoxy composition, and is predicted by the Fox equation where "w" is the wt. % of solid epoxy resin in the blend (Tg is calculated in degrees Kelvin):

$$1/Tg = w/T_{g,solid} + (1-w)/T_{g,liquid}.$$

As used herein the term "emulsion" and the term "dispersion" mean the same thing and can be used interchangeably.

As used herein, unless otherwise indicated, the phrase "glass transition temperature" or "Tg" refers to a calculated Tg.

As used herein, unless otherwise indicated, the phrase "molecular weight" refers to the weight average molecular weight as measured by gel permeation chromatography (GPC) against a poly(styrene) standard.

As used herein, the term "multilayer polymer particle" refers to polymer particles having two or more layers associated with one another including by chemical grafting, encapsulation, and physical adsorption (physiadsorption).

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein the term "total RDP weight" refers to polymer, colloidal stabilizer, and any additive solids in the RDP powder.

As used herein, the term "wt. %" stands for weight percent.

An epoxy RDP having an alkali soluble shell does not give acceptable redispersibility in a cement pore solution, which is the aqueous phase of a wet cement mixture. This can adversely impact the efficiency of the RDP, requiring end users to add substantially more RDP to a cement to get the same effect. In contrast, the multilayer polymer particle RDP of the present invention is itself redispersible in a cement pore solution (see Table 2, below). The present inventors have found that incorporating from 10 to 200 mole % or higher, preferably 25 to 100 mole % of $M^{2+}$ ions, based on the number of moles of carboxyl groups in the alkali soluble resin shell dramatically reduces the sensitivity of the epoxy containing RDP to any divalent metal ions, for example, Ca2+ dissolved in the cement pore solution during use of a cement with the RDP. The present invention thereby enables better distribution of epoxy particles in cement, greatly improved shelf life.

In powder form, epoxy particles tend to associate with one another to form clusters of particles; however, these clusters of particles dissociate in an aqueous medium to allow redispersion in to a dispersion of fine particles that can be smaller than the RDP powder itself. The multilayer polymer particle RDP of the present invention can redisperse into an aqueous phase to produce a particle size of, for example, 5 μm or less, preferably, 2 μm or less, or, more preferably 1 μm or less. There is no known lower limit for the particle size for the redispersed RDP particles of the present invention yet the particles generally have a particle size greater than one nanometer and more, typically 10 nanometers or larger.

Metal ions in aqueous solution exist as aqua ions, where water molecules act as ligands and coordinate to the metal ion via the oxygen donor atoms. Metal aqueous ions can act as Brønsted acids, which means that they can act as proton donors. The pKa or aqueous acid dissociation constant for the following equilibrium can be established for free metal ions according to the following equilibrium relationship:

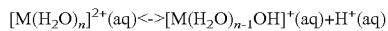

$$[M(H_2O)_n]^{2+}(aq) <-> [M(H_2O)_{n-1}OH]^+(aq) + H^+(aq)$$

The pKa of several divalent metal ions is shown in Table 1, below

TABLE 1 pKas of Selected Divalent Metal Ions

| Metal ion | pKa |
|---|---|
| $Be^{2+}$ | 5.6 |
| $Cu^{2+}$ | 7.5 |
| $Fe^{2+}$ | 9.5 |
| $Zn^{2+}$ | 9.6 |
| $Mg^{2+}$ | 11.4 |
| $Ca^{2+}$ | 12.7 |
| $Sr^{2+}$ | 13.2 |
| $Ba^{2+}$ | 13.4 |
| $Al^{3+}$ | 5 |

Suitable divalent metal ions for use in the present invention include those having a pKa (in water) of >9.55, preferably Zn, Ba, Mg or Ca. Zinc can be added as a fine powder which will dissociate in water. The pKa in water of the divalent metal ions has no upper limit, but can be 30 or less. Suitable divalent metal ion salts include any strong acid salts, e.g., chlorides, sulfates or phosphates, or organic acid salts, e.g., acetates, succinates and citrates, provided that such salts as a 1 wt. % solution in water give a pH of 7 or less, preferably, 6 or less. Strong acid salts, such as $CaCl_2$ are preferred.

The epoxy resin in the multilayer polymer particle of the present invention is present at a very high concentration of 50 wt. % or higher, preferably, 65 wt. % or greater, still more preferably, 75 wt. % or greater and can be present at a concentration of 85 wt. % or greater and up to 90 wt. % or less based on total epoxy RDP particle weight.

The glass transition temperature (Tg) of the epoxy resin ranges from 0 to 45° C. Lower Tg epoxy resins are desirable because they diffuse more quickly as a binder and because they are film forming even room temperature or below. However, lower Tg epoxy resins, especially those in liquid form in processing conditions, tend to diffuse more easily between RDP particles and can cause irreversible agglomeration of the particles which precludes effective redispersibility of the epoxy powder. This challenge is accentuated in the epoxy RDPs of the present invention by the relatively high concentration of epoxy resin in the multilayer polymer RDP particles. Diffusion of epoxy resin between particles is believed to be one reason why epoxy resin concentrations in the range of the present invention are unknown in RDP form.

Preferably, blends of solid and liquid epoxy resins can be used to fine tune the glass transition temperature of the epoxy to the desired or preferred range, thereby maximizing film formation and storage stability and redispersibility.

Suitable epoxy resins for use in the present invention include aliphatic, araliphatic and aromatic epoxy compounds which are polyglycidyl ethers of a polyol, such as a hydroxyl-functional oligomer. Such epoxy resins have at least 2 glycidyl groups and are the reaction products of a polyol, such as a glycol, or a hydroxyl-functional oligomer, with an epihalohydrin, such as epichlorohydrin. Such preparations are well known in the art (see for example U.S. Pat. No. 5,118,729, columns 4-7 and "Epoxy resins" by Pham, H. Q. and Marks, M. J. in Ullmann's Encyclopedia of Industrial Chemistry, Wiley-VCH Verlag, Weinheim, 2005).

Examples of suitable polyols include polyhydric phenols and polyhydric alcohols. Specific non-limiting examples of monomeric polyols are resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, tetra-methylbiphenol, tetramethyl-tetrabromobiphenol, tetramethyl tribromobiphenol, tetrachlorobisphenol A, 4,4'-sulfonyldiphenol, 4,4-oxydiphenol, 4,4'-dihydroxybenzophenone, 9,9'-bis(4-hydroxyphenyl)fluorine, 4,4'-dihydroxybiphenyl, and 4,4'-dihydroxy-α-methylstilbene. Examples of hydroxyl-functional oligomers include phenol-formaldehyde novolak resins, alkyl substituted phenol-formaldehyde resins, phenol-hydroxybenzaldehyde resins, cresol-hydroxybenzaldehyde resins, dicyclopentadiene-phenol resins, and dicyclopentadiene-substituted phenol resins. Suitable polyols for making the epoxy resin can be substituted, if desired, with one or more non-interfering substituents, such as halogen atoms, ether radicals, lower alkyls and the like. An oligomeric or polymeric compound such as a phenol-formaldehyde novolac may be used as the polyhydroxy compound.

Preferably, the polyol used to prepare the epoxy resin is an aromatic dihydroxy compound, such as bisphenol A and/or bisphenol F.

Preferred examples of epoxy resins for use in the present invention include the diglycidyl ether of bisphenol A, such as the be condensates of bisphenol A and epichlorohydrin or methylepichlorohydrin; the diglycidyl ether of bisphenol F that generally contain the condensates of a mixture of bisglycidyloxyphenylmethanes ("Bisphenol F-type resins"); a mixed diglycidyl ether of bisphenol A and F; the diglycidyl ether of a phenol-formaldehyde novolak; and modified epoxy resins such as epoxy resins, e.g., bisphenol A based epoxy resins, modified with an epoxy functional surfactants, such as, for example, epoxy functional nonionic or epoxy functional anionic surfactant, and/or poly(alkylene glycol) epoxide, typically poly(propylene glycol) epoxide or poly (ethylene glycol) epoxide. The epoxy resin can be and desirably is free of sulfur.

One suitable epoxy resin is a linear, non-cross-linked polymer of bisphenol A and epichlorohydrin having terminal epoxide groups. A specific example of a suitable epoxy resin which may be employed herein is D.E.R. 664U, a solid epoxy resin of medium molecular weight, which is the solid reaction product of epichlorohydrin and bisphenol A, having a softening point of 100° C. to 110° C. (The Dow Chemical Company, Midland, Mich.).

In accordance with the methods of the present invention, mechanically dispersing epoxy resin into an aqueous medium to form the initial epoxy resin dispersion may comprise providing the epoxy resin in a softened state, such as, for example, by heating it to a temperature higher than its Tg, if needed, and combining it with an aqueous phase under shear. The shear serves to break the epoxy resin into particles as it disperses those particle into the aqueous phase. Such methods are taught, for example, in U.S. Pat. No. 4,123,403.

In mechanical dispersion processes, an aqueous phase and an organic phase are combined with shearing, such as by feeding them through a high shear mixer that disperses one phase into the other. This may form a high internal phase emulsion. High internal phase emulsions generally have a greater than 74 volume % internal phase dispersed within a continuous phase where volume percent is relative to the total emulsion volume. In such methods, the epoxy resin and aqueous phase can be fed into a high shear mixer to produce a dispersion. If a high internal phase dispersion of epoxy resin in aqueous phase is produced, it can be diluted down with additional aqueous phase if desired to, for example, reduce viscosity of the dispersion. A particularly desirable benefit of mechanical dispersion is that it can produce dispersions with dispersed particles having a highly uniform particle size (narrow particle size distribution) that can be two μm or less, or, preferably, one μm or less. The epoxy resin particles in the initial epoxy resin dispersion desirably have a particle size of 5 μm or less, preferably, 2 μm or less, or, more preferably 1 μm or less, or, yet more preferably 750 nm or less. Generally, smaller particles require higher shear to form.

Suitable shearing methods include extrusion and melt kneading in a known manner including, for example, in a kneader, a Banbury mixer, single-screw extruder, or a multi-screw extruder. A preferred melt-kneading machine is, for example, a multi screw extruder having two or more screws, to which a kneading block can be added at any position of the screws. If desired, an extruder may be provided with a first material-supplying inlet, such as for the epoxy resin, a second material-supplying inlet, such as for and any dispersant, and, further, if desired, third and forth material-supplying inlets in this order from the upstream to the downstream along the flow direction of a material to be kneaded. Further, a vacuum vent may be added.

Preferred shearing devices include a multi screw extruder having two or more screws for continuous processing, and rotor stator mixer and pressurized high shear device for batch processing.

Mechanically dispersing the epoxy resin into the aqueous phase can comprise a batch, semi-continuous or continuous process. Batch processes include preparing the epoxy resin dispersion in a single container by adding the aqueous phase and epoxy resin together while mixing. It is common to add the epoxy resin to the aqueous phase while mixing, however both the aqueous phase and epoxy resin can be added together to the vessel while mixing or the epoxy resin can be added first and the aqueous phase added while mixing. It is also possible to add the epoxy resin and aqueous phase together without mixing and, once the two components have been combined, then mix them together to form a dispersion.

Preferably, a continuous shearing method comprises mixing both aqueous phase and epoxy resin in a continuous stream to produce the initial epoxy resin dispersion, such as in a multi-screw extruder.

Suitable epoxy resins having a Tg of 40° C. or lower, especially those with a Tg of 35° C. or lower, 30° C. or lower are more readily softened for forming the initial epoxy resin dispersion without requiring further heating or softening of any other kind. This avoids the cost and complexity of applying heat to soften the epoxy resin. Preferably, to enable fine tuning of their Tg, such epoxy resins can be blends of low and higher molecular weight epoxy resins as well as epoxy resins that are liquid at ambient temperature. The aqueous phase is preferably water.

In the initial aqueous epoxy resin dispersion, the epoxy resin can contain plasticizers to help them flow, for example, fugitive plasticizer, non-fugitive plasticizer, a combination of fugitive and non-fugitive plasticizer. Preferably, the epoxy resin is free of plasticizer.

Preferably, the initial epoxy resin dispersion is formed in the absence of any organic solvent which means that it contains less than 1000 ppm, or preferably, less than 500 ppm of such a solvent. Organic solvents exclude fugitive plasticizers and monomers.

Preferably, a dispersing agent may be used to prepare the initial epoxy resin dispersion. The dispersing agent can be added to the epoxy resin or directly to the aqueous phase prior to dispersing the epoxy resin, or added to the initial epoxy dispersion as the epoxy resin and aqueous phase are being mixed. Suitable dispersing agents for stabilizing the initial epoxy resin dispersion include any colloidal stabilizers taught above with regard to the epoxy RDP, such as, for example, polyvinyl alcohol (PVOH). Suitable amounts of dispersing agent in the initial epoxy resin dispersion are 15 wt. % or less, preferably, from 4 to 10 wt. % based on total epoxy resin weight.

The alkali soluble polymer shell around the epoxy resin in the multilayer polymer particle RDP of the present invention may prevent the epoxy resin from diffusing from one particle to another, thereby precluding irreversible agglomeration of particles. As the shell is located around the particle rather than blended with the epoxy resin in the particle, the multilayer polymer particles can contain a low concentration of shell (and, hence, much higher concentration of epoxy resin). The alkali soluble polymer shell also releases the epoxy when the epoxy is desired for use as a binder in a cementitious (or other alkaline) formulation because the alkali soluble shell dissolves upon dispersing the RDP particles of the present invention into an aqueous alkali composition.

The monomers used to make the alkali soluble polymer are selected so as to form an alkali soluble polymer shell having a calculated glass transition temperature (Tg) of 60° C. or higher, or up to 150° C., preferably 80° C. or higher, or up to 120° C., or, still more preferably 90° C. or higher, even more preferably 100° C. or higher. It is desirable for the alkali soluble polymer shell to have a higher Tg to resist irreversible agglomeration of particles during isolation of the epoxy RDP particles, particularly in the presence of components such as dispersing agents that might plasticize the alkali soluble polymer shell.

The alkali soluble polymer shell comprises the copolymerization product of 5 or more wt. % and up to 40 wt. %, preferably, 30 wt. % or less, or, preferably 10 wt. % or more, or, more preferably, 15 wt. % or more, and yet more preferably, 20 wt. % or more of monomers selected from methacrylic acid and anhydride monomers, based on the total weight of monomers polymerized to form the alkali soluble polymer shell, with the remainder one or more copolymerizable ethylenically unsaturated monomers. As concentrations of carboxylic acid or anhydride monomer range below 20 wt. %, the alkali soluble polymer will comprise the reaction product of some hydrophilic monomer(s) to insure that the polymer is alkali soluble.

Suitable hydrophilic monomers, where needed, may comprise hydroxyalkyl esters of a carboxylic acid or (meth) acrylamide. Useful amounts of such hydrophilic monomers may range from zero to 25 wt. % based on the total weight of monomers polymerized to form the alkali soluble polymer shell, or, preferably from 0 to 20 wt. %.

The remaining copolymerizable ethylenically unsaturated monomers used to form the alkali soluble polymer shell are desirably chosen from alkyl methacrylates, such as, for example, 2-ethylhexyl methacrylate, methyl methacrylate, ethyl methacrylate, butyl methacrylate, and fatty alkyl methacrylates, such as lauryl methacrylate. Such monomers may comprise 30 to 95 wt. % of monomers, based on the total weight of monomers polymerized to form the alkali soluble polymer shell.

The copolymerizable ethylenically unsaturated monomers can further comprise up to 25 wt. %, preferably up to 10 wt. %, based on the total weight of monomers used to make the copolymer, of one or more other nonionic monomers, such as vinyl aromatic monomers like styrene or alkyl substituted styrene; and alkyl acrylates may be copolymerized in to the alkali soluble polymer.

Preferably, the nonionic monomers comprise hard hydrophobic monomers, such as vinyl aromatic to improve the shell stability.

Preferably, all of the ethylenically unsaturated monomer mixture can be combined with the already formed initial aqueous epoxy resin dispersion before or during their polymerization. Most preferably, all of the ethylenically unsaturated monomer mixture is added by gradual addition, e.g., metering it, into the reaction vessel containing the initial aqueous epoxy resin dispersion. Such monomers, including the carboxylic acid or anhydride monomers may be added during or prior to addition of an addition polymerization catalyst, preferably in a separate feed.

The ethylenically unsaturated monomer mixture of the present invention is polymerized by conventional emulsion polymerization. Addition polymerization catalysts are fed into the reaction vessel before, during or after addition of the unsaturated monomers, with stirring and, optionally, with heating. Suitable catalysts include thermal and/or redox triggered free radical initiators, preferably that are water soluble. Examples of suitable thermally triggered initiators include peracid salts, such as alkali metal persulfate salts, such as, for example, sodium persulfate; or ammonium persulfate. Suitable redox initiators include combinations of oxidizing agents (such as persulfate salt and organic peroxides) and reducing agents (such as sodium formaldehyde sulfoxylate) and a redox catalyst such an iron (II) sulfate.

The conditions that result in free radical polymerization depend on the type of free radical initiator added and are known to the ordinary skilled artisan. Depending on the initiation temperature of the initiator and the ambient temperature of the mixture, thermally triggered initiators may require heating the monomer mixture. The amount of free radical initiator is generally 0.01 wt. % or more, preferably 0.1 wt. % or more while at the same time is generally two wt. % or less, with wt. % relative to total ethylenically unsaturated monomer weight.

The resulting dispersion comprising multilayer polymer particles having an alkali soluble shell is a dispersion of the present invention.

The weight-average molecular weight of the alkali soluble polymer shell may range from 2,500 grams per mole (g/mol) to 700,000 g/mol, or 500,000 g/mol or less, or 250,000 g/mol or less, or, preferably, 5,000 g/mol or more, or, preferably, 100,000 g/mol or less. An excessively high molecular weight can cause a viscosity buildup at and alkaline pH, thereby leading to handling problems.

Preferably, the alkali soluble polymer shell comprises copolymers of methacrylic acid and methyl methacrylate. In such a copolymer, the concentration of copolymerized methacrylic acid ranges 10 wt. % or more, preferably 15 wt. %, or, more preferably, 20 wt. % or more while at the same time desirably being 40 wt. % or less. The balance of the copolymer is copolymerized methyl methacrylate.

The alkali soluble shell is primarily located around the surface of the epoxy RDP particles and as such efficiently protects the epoxy resin within the particles. As such, the concentration of alkali soluble shell can be equal to or less than the concentration of epoxy resin and still preclude irreversible agglomeration of the epoxy RDP particles. The concentration of the alkali soluble shell may range less than 50 wt. %, preferably, 40 wt. % or less, or, more preferably, 30 wt. % or less, or, even more preferably, 25 wt. % or less, and at the same time should range 10 wt. % or more, or, preferably, 15 wt. % or more and still more preferably 20 wt. % or more relative to the total weight of the multilayer polymer particle RDP.

Removing the aqueous phase and isolate the resulting RDP particles can be done any number of ways including freeze drying or spray drying (atomization), or a combination of both, preferably by spray drying. Such removal of the aqueous phase is conventional in the art and is as described, for example, in US 20110160350A1 by Bergman et al.

Preferably, drying the aqueous admixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 140° C. to 170° C. The outlet temperature may generally be from 30° C. to 100° C., preferably from 50° C. to 80° C., depending on the plant, the Tg of the resin and the desired degree of drying. In one example, the viscosity of the feed to be spray-dried may be adjusted via the solids content so that a value of less than 1000 mPas (Brookfield viscosity at 20 rpm and 23° C.), preferably less than 250 mPas, is obtained. The solids content of the admixture to be spray-dried may generally be from 25% to 60% by weight, preferably from 35% to 50% by weight, based on the total weight of the dispersion.

To help prevent irreversible agglomeration of the epoxy resin particles it is common to introduce an anti-caking agent to the epoxy resin particles during the spray drying step. Anti-caking agent can be added in any manner including mixing in with the dispersion prior to spray drying or mixing with the dispersion while spray drying by, for example, blowing into to a chamber with the dispersion.

The RDP of the present invention can be self-stabilized by the alkali soluble polymer shell where that shell polymer comprises the reaction product of 20 wt. % of more of the methacrylic acid or its anhydride, based on the total weight of monomers used to make the alkali soluble polymer shell.

Preferably, the RDP of the present invention is stabilized by one or more colloidal stabilizer.

The colloidal stabilizer or a dispersing agent, or both, can be added while feeding and polymerizing the ethylenically unsaturated monomer mixture, while removing the aqueous phase from the multilayer polymer particle RDP particles, or both. Colloidal stabilizer added when spray drying should facilitate redispersion of the RDP particles when the RDP particles are added to an aqueous medium. It is particularly desirable to add a colloidal stabilizer to the RDP particles during the spray drying process.

Suitable colloidal stabilizers may include one or more of a polyvinyl alcohol (PVOH), preferably a partially hydrolyzed PVOH, cellulosic thickeners, such as hydroxypropyl cellulose, or hydroxyethyl methyl cellulose; polymers of methyl vinyl ether; poly vinyl pyrrolidone; and water soluble copolymers of ethylenically unsaturated carboxylic acids, such as (meth) acrylic acid or its salts.

Surfactants can be useful as an additive in the RDP of the present invention to facilitate redispersing of the epoxy particles in an aqueous solution. Suitable surfactants, such as, for example, anionic, cationic and/or nonionic surfactants may be used in place of at least part of a colloidal stabilizer. Surfactants containing ethylene oxide groups range in amounts of less than 5 wt. %, based on the total weight of colloidal stabilizer plus surfactant because such surfactants can interfere with the protective nature of the alkali soluble shell.

Suitable amounts of the colloidal stabilizer, when added, may range 3 wt. % or more, or, preferably, 5 wt. % or more, or, still more preferably, 7 wt. % or more, and can be present at a concentration of 10 wt. % or more, or up to 25 wt. % or less, or, preferably 20 wt. % or less, or, more preferably, 15 wt. % or less based on total epoxy resin, alkali soluble polymer and colloidal stabilizer solids. Preferably, the desired concentration of PVOH added during the spray drying process may range from 5 to 15 wt. % relative to total epoxy resin and alkali soluble polymer solids.

The epoxy RDP of the present invention desirably includes one or more anti-caking agent to improve powder flowability. Anti-caking agents may be used when spray drying the polymer aqueous dispersion to isolate the multilayer polymer particles. Accordingly, the anti-caking agent can be added in any manner including mixing in with the dispersion prior to spray drying or mixing with the dispersion while spray drying by, for example, blowing into to a chamber with the dispersion. Suitable anti-caking agents include mineral filler such as calcium carbonate, kaolin, barium sulphate, titanium oxide, talc, hydrated alumina, bentonite, calcium sulphoaluminate and silica.

Suitable amounts of anti-caking agent in the range 50 wt. % or less, or, preferably 20 wt. % or less, or, more preferably 15 wt. % or less, or, still more preferably 10 wt. % or less, or, even more preferably 5 wt. % or less relative to total RDP weight including colloidal stabilizer and additive solids. The RDP can be free of anti-caking agent, but generally contains 0.5 wt. % or more, or, preferably 2 wt. % or more, or, more preferably 5 wt. % or more relative to total RDP weight.

The multilayer polymer particle water redispersible powder (RDP) of the present invention can be dispersed in an aqueous medium to form a dispersion of fine particles, which is also a dispersion of the present invention. For dispersing the RDP of the present invention into an aqueous medium (preferably water), the pH of the dispersion formed may fall in a pH range of 9-13 where the base comprises a cationic species, such as ammonia or NaOH or a base. Cement provides sufficient alkalinity for redispersion of the RDP of the present invention.

The multilayer polymer particle RDP of the present invention is particularly useful for formulating with cementitious components to form epoxy modified cement. The RDP can be dry blended with cement to make a dry mix to which water can be added in use.

Dispersions of multilayer polymer particles that fall within the scope of the present invention include the dispersion of multilayer polymer particles comprising an alkali soluble shell prior to removing the aqueous phase that is formed during the method of the present invention.

EXAMPLES

Synthesis Example 1

Batch Mechanical Dispersion

To a stainless steel (300 mL) PARR pressure reactor having a 6.67 cm inside diameter, a Cowles blade stirrer, and equipped with an optional pulley system to allow a mixer speed of up to 1825 rpm was charged either 70.0 g of D.E.R. 661 (type 1 solid bisphenol-A epoxy resin, Mw=1500 g/mol, epoxy equivalent weight=500-560, Dow Chemical, Midland, Mich.) or 70.0 g of an epoxy resin blend of D.E.R. 331 (liquid bisphenol-A epoxy resin, Mw=380 g/mol, EEW=182-192, Dow) and D.E.R. 669E (type 9 solid bisphenol-A epoxy resin, Mw=15000 g/mol, EEW=2500-4000, Dow) and 25.0 g of MOWIOL 4-88 aqueous solution (Polyvinyl alcohol, 88% hydrolyzed, commercially available from Kuraray Europe GmbH, solid content=28.0 wt. %). The Tgs of epoxy resin or blend are shown in Table 1. The stirrer assembly was inserted into the vessel and turned by hand until it spun freely. The Parr reactor assembly was then loaded onto its ring stand and water hoses were attached to the stirrer's cooling sleeve. The thermocouples and stirrer motor were connected, and the heating mantle was lifted into place and tightened. The reactor was sealed and heated to 100° C., and after reaching the temperature the mixture was stirred for 10 minutes to allow sufficient mixing of the epoxy resin and PVOH solution together at ~1830 rpm. To this mixture water was added using a HPLC pump at the rate of 1 mL/min for 20 min. The water addition rate was increased to 10 mL/min for 5 min while the heating mantle was removed and the Parr reactor was cooled by air and water. The reactor was cooled down to 50° C. in water bath with stirring. The resultant dispersion was collected by filtration through a 190 μm filter and had a 40-45% solids content.

Synthesis Example 2

Continuous Extrusion Dispersion Process

The Epoxy Dispersions were prepared using a KWP (KRUPP WERNER & PFLEIDERER) ZSK25 extruder (60 L/D rotating at 450 rpm) with the formulation components shown in Table 1, below, as follows:

The solid epoxy resin (D.E.R. 669E (type 9 solid bisphenol-A epoxy resin, Mw=15000 g/mol, EEW=2500-4000, Dow) or D.E.R. 667E (type 7 solid bisphenol-A epoxy resin, Mw=10000 g/mol, EEW=1600-1950, Dow) and the semi-crystalline MOWIOL 488 (Polyvinyl alcohol, 88% hydrolyzed, commercially available from Kuraray Europe GmbH)) were supplied to the feed throat of the extruder via a Schenck Mechatron loss-in-weight feeder and then melted blended, and a liquid epoxy stream (D.E.R. 331, liquid bisphenol-A epoxy resin, Mw=380 g/mol, epoxy equivalent weight EEW=182-192) was injected into the melt zone to melt blend with solid epoxy and dispersant before entering the emulsification zone. The initial aqueous stream (IA) was then injected into the emulsification zone, and the melt polymer blend was then emulsified in the presence of water in the extruder. If indicated in the formulations, a co-dispersant E-SPERSE 100 (PEO (14) di- and tristyrenated Phenol ammonium sulfate (from Ethox Chemicals, LLC)) was injected into the emulsification zone together with IA. The emulsion phase was then conveyed forward to the dilution and cooling zone of the extruder where additional water was added to form the aqueous dispersions having solid level levels of less than 60 weight percent. The properties of each of the dispersion components made according to this methods were measured, and reported in Table 1. The initial water and liquid co-dispersants like E-SPERSE 100, and dilution water were all supplied by ISCO 500-D Series dual syringe pumps (500 ml, Teledyne Isco, Lincoln, Neb.). The barrel temperature of the extruder was set to 100° C. After the dispersion exited the extruder, it was further cooled and filtered via a 200 μm mesh size bag filter.

TABLE 1

Summary of Epoxy blend dispersions

| Dispersion[2] | Epoxy or blend (pbw) | Dispersant (pbw) | Co-dispersant | Solid in dispersion (wt. %) | $V_{mean}$ (μm)[1] |
|---|---|---|---|---|---|
| A | D.E.R. 661 Tg = 41° C. 100 part | MOWIOL™ 488 10 part | None | 39.18 | 0.323 |

TABLE 1-continued

Summary of Epoxy blend dispersions

| Dispersion[2] | Epoxy or blend (pbw) | Dispersant (pbw) | Co-dispersant | Solid in dispersion (wt. %) | $V_{mean}$ (μm)[1] |
|---|---|---|---|---|---|
| B | DER669E/DER331 (3:2); Tg = 28° C. 100 part | MOWIOL ™ 488 10 part | None | 40.10 | 0.350 |
| C | DER669E/DER331 (33/67); Tg = 5° C. 100 part | MOWIOL ™ 488 10 part | None | 45.7 | 0.218 |
| D | DER667E/DER331 (60/40); Tg = 22° C. 100 part | MOWIOL ™ 488 6.2 part | E-SPERSE 100 2 part | 56.94 | 0.443 |
| E | DER669E/DER331 (50/50); Tg = 15° C. 100 part | MOWIOL ™ 488 6.2 part | E-SPERSE 100 2 part | 44.97 | 0.351 |

[1]Volume average particle diameter;
[2]Dispersions A-C were prepared by the batch dispersion process, and dispersions D-E were prepared by continuous dispersion process.

Example 3

Seed Polymerization

For the dispersions of epoxy resins with alkali soluble polymers listed in Table 2 below, seeded emulsion polymerization of the acrylic monomers was conducted. All polymerizations were conducted by charging into a round bottom flask reactor the indicated amount as solids of the epoxy dispersion and purging with nitrogen gas while maintaining at 60° C. While stirring, add catalyst (in dispersion J, below, for each 36 g of epoxy solids, adding 10 mg of ferrous sulfate as a 1 wt. % aqueous solution). Premix the indicated monomer in the proportions indicated in Table 2 below (in dispersion J, using 6.60 grams of methyl methacrylate and 1.65 grams of methacrylic acid) and inject the mixture into the reactor over 60 minutes. At the same time, feed a redox catalyst pair (in dispersion J, using, for each 36 g of epoxy solids, 2.5 g of 2.5 wt. % aqueous solution of tert-butyl peroxide, and separately 2.5 g of 2.5 wt. % aqueous solution of sodium hydroxymethanesulfinate) so as to add a total of 0.75 wt. % solids of each catalyst component relative to acrylic monomer solids weight into the reactor as a free radical initiator over 90 min. Maintain the reaction at 60° C. for 90 min and then allow to cool to 25° C. and filter through a 190 μm filter. The resulting dispersion comprises, for example in dispersion J, epoxy resin particles containing 25 wt. % alkali soluble shell comprising a copolymer of methacrylic acid and methyl methacrylate, with wt. % relative to the epoxy resin.

TABLE 2

Summary Of Epoxy/Acrylic Hybrid Dispersions

| Dispersion[1,2] | Epoxy or Epoxy Blend (pbw) | Dispersant | ASR shell* | $V_{mean}$ (μm) |
|---|---|---|---|---|
| F | DER661 Tg = 41° C. 100 part | MOWIOL ™ 488 10 part | PMMA-PMAA (4:1) 20 part | 340 |
| G | DER669E/331 (3:2) Tg = 28° C. 100 part | MOWIOL ™ 488 10 part | PMMA-PMAA (4:1) 20 part | 365 |
| H | DER669E/DER331 (33/67); Tg = 5° C. 100 part | MOWIOL ™ 488 10 part | PMMA-PMAA (4:1) 25 part | 240 |
| I | DER667E/DER331 (60/40); Tg = 22° C. 100 part | MOWIOL ™ 488 10 part E-SPERSE 100 2 part | PMMA-PMAA (4:1) 25 part | 458 |
| J | DER669E/DER331 (50/50); Tg = 15° C. 100 part | MOWIOL ™ 488 10 part E-SPERSE 100 2 part | PMMA-PMAA (4:1) 25 part | 370 |
| K | | MOWIOL ™ 488 10 part E-SPERSE 100 2 part | PMMA-PMAA (85:15) 25 part | 370 |
| L | | MOWIOL ™ 488 10 part E-SPERSE 100 2 part | PMMA-PMAA (4:1) 15 part | 365 |
| M | | MOWIOL ™ 488 10 part E-SPERSE 100 2 part | PMMA-PAA (4:1) 25 part | 365 |

[1]Dispersions F, G, H and I were prepared from dispersions A, B and C, D respectively, and dispersions J, K, L, and M were prepared from Dispersion E. Different amount of acrylic monomers were used in dispersions K, L, and M. Initiator concentrations are the same in all dispersions, each of SFS and t-BuOOH is 0.75 wt. % based on total acrylic monomers;
[2]For dispersions H-M, additional PVOH was added into the dispersions after polymerization to get 10 part PVOH, based on epoxy resin solids;
*Calculated Tg of above ASR shells should be at least 100° C.

Synthesis Example 3

Spray Drying Process

A two-fluid nozzle atomizer was equipped on a MOBILE MINOR™ 2000 Model H spray dryer (GEA Niro, Denmark). The air pressure to nozzle was fixed at 1 bar with 50% flow which is equivalent to 6.0 kg/hour of air flow. A glass jar was placed under the cyclone with the valve on the bottom of the cyclone open. Each of the aqueous dispersions from Table 2 (about 35-40 wt. % solid content) was pumped into a heated chamber by an emulsion feed pump (from Cole-Parmar Instrument Company, Vernon Hills, Ill.). The spray drying was conducted in $N_2$ environment with an inlet temperature fixed at 140° C., and the outlet temperature was targeted at 50° C. by tuning the feed rate of the dispersion (feed rate=20-30 mL/min). Simultaneously to the dispersions, kaolin clay powder (KaMin™ HG-90, Kamin is a trademark of Kamin LLC, Macon, Ga.) was fed into the chamber as an anti-caking agent at 0.5-1.0 g/min. The polymer dispersion was atomized using high air pressure at the nozzle atomizer, while the vacuum fan constantly pulled nitrogen/moisture through the filter, and most of the dry powder was recovered in the glass jar attached on the cyclone. The residual polymer powder having an approximate average particle size of between 10 and 40 μm was collected in the filter before ventilation.

The following test methods were used:
Particle Size Analysis for Polymer Dispersions and Redispersions of the RDP Samples:

An epoxy multilayer polymer particle dispersion sample was diluted in de-ionized (DI) water prior to analysis to avoid saturating the detector. Epoxy RDP was dispersed into DI water at 1% solids wt. (at pH=7) and vortexed for 30 seconds twice. In addition, to measure the particle size in alkaline condition, 2 drops of 1 M NaOH solution or cement pore solution shown in Table 3, below, was added into the redispersion to raise the pH to >10. Particle size was measured with a Beckman Coulter LS 13 320 Laser Light Diffraction Particle Size analyzer, using an epoxy resin model predetermined by the instrument software. Solid content analysis was performed on an Ohaus MB45 (Ohaus Corporation, Parsippany, N.J.) moisture analyzer.

TABLE 3

Cement Pore Solution

| Ion | Concentration (g/l) |
|---|---|
| $K^+$ | 7.1 |
| $Na^+$ | 2.2 |
| $Ca^{2+}$ | 0.4 |
| $SO_4^{2-}$ | 8.2 |
| $OH^-$ | 2.0 |

Redispersibility in Cement Solution Vs Alkaline Water with NaOH:

The cement pore solution used is shown in Table 2, above; pH=12.6 (Portland cement at water to cement w/c ratio of ~0.5 by weight). Reference: Gretz, M.; Plank, *J. Cement and Concrete Research* 41 (2011) 184-190. To test redispersibility, a sample of the indicated multilayer polymer particle RDP an indicated additive was added into the RDP dispersion before spray drying in the indicated amounts and redispersibility is a measure of volumetric percentage of RDP particles below 2 μm in the redispersion after a period of 1 day at ambient temperature. An acceptable redispersibility reading is 50% or higher, preferably, 75% or higher.

TABLE 4

Redispersibility Of Multilayer Polymer Particles

| | | Additive (molar | Redispersibility (%) | |
|---|---|---|---|---|
| Example | Multilayer Polymer RDP | ratio of $M^{2+}$:PMAA)[1] | Aqueous NaOH | Cement pore solution |
| 1* | From dispersion F | None | 100 | 100 |
| 2* | From dispersion G | None | 100 | <20 |
| 3 | From dispersion G | CaCl$_2$ (0.25) | 100 | 100 |
| 4* | From dispersion I | None | 100 | <20 |
| 5 | From dispersion I | Ca(OH)$_2$ 0.5 | <20 | <20 |
| 6 | From dispersion I | CaCl$_2$ 0.5 | 100 | 100 |
| 7 | From dispersion I | Ca(Ac)$_2$ 0.5 | 100 | 50 |
| 8 | From dispersion I | Zn (0.20 mm powder) 0.25 | 100 | 100 |
| 9 | From dispersion I | BaCl$_2$ (0.25) | 100 | 100 |
| 10 | From dispersion I | CuCl$_2$ (0.25) | <20 | <20 |
| 11 | From dispersion I | FeCl$_2$ (0.25) | <20 | <20 |
| 12* | From dispersion I | NaCl (0.5) | 100 | <20 |
| 13 | From dispersion H | CaCl$_2$ 0.5 | 100 | 100 |

*Comparative examples;
[1]To get mole %, multiply by 100%.

As shown in Table 4, above, the multilayer polymer particle RDP having a Tg of from 5 to 40° C. in Examples 2 and 4 is fully redispersible in an alkaline medium containing NaOH only, but was not redispersible in a cement pore solution. As shown in Examples 3, 6-10 and 12, addition before spray drying of a $M^{2+}$ ion soluble metal or acid salt additive having a metal pKa of 9.55 or greater and which has a pH in water of 7.0 or less, at a 1 wt. % aqueous concentration, gives a multilayer polymer particle RDP that exhibits good to excellent redispersibility in a cement pore solution. In Example 13, even a low Tg (5 deg C.) shell in a multilayer polymer particle RDP gave good redispersibility when the additive of the present invention was used. As shown in Example 8, the additive can be used in the form of a fine metal powder. As shown in Example 10, metals having a lower pKa did not aid in redispersibility. In contrast, as shown in Example 5 adding high pH salt like Ca(OH)$_2$ into the epoxy/ASR hybrid dispersion impaired redispersibility. As shown in Example 11, a monovalent metal does not aid in redispersibility.

TABLE 5

Redispersibility and Acid Monomers

| | | Additive[1] (molar | Redispersibility (%) | |
|---|---|---|---|---|
| Example | Multilayer Polymer RDP | ratio of $M^{2+}$:PMAA) | Aqueous NaOH | Cement pore solution |
| 14* | From dispersion J | None | 100 | <20 |
| 15 | From dispersion J | CaCl$_2$ 0.25 | 100 | 100 |
| 16* | From dispersion K | CaCl$_2$ (0.25)** | <20 | <20 |
| 17 | From dispersion K | CaCl$_2$ (0.25) | 100 | 100 |
| 18 | From dispersion L | CaCl$_2$ (0.25) | 100 | 60 |
| 19* | From dispersion M | CaCl$_2$ (0.25) *** | 20 | 20 |

*Comparative examples;
**Additive included in emulsion polymerization medium, not free-flowing powder;
*** Not free flowing powder;
[1]To get mole %, multiply by 100%.

As shown in Table 5, above, for the lower alkali soluble polymer shell content in Example 18, a divalent metal additive less effectively aided redispersibility. In comparative Example 16, including the additive during the epoxy seeded emulsion polymerization negatively affected redispersibility. An acrylic acid alkali soluble polymer in comparative Example 19 did not give an multilayer polymer particle RDP having acceptable redispersibility. However, methacrylic acid in alkali soluble polymers gave good redispersibility even at low acid concentrations in Example 17.

We claim:

1. A redispersible polymer powder composition comprising as powder multilayer polymer particles of (i) from 50 to 90 wt. %, based on total polymer solids, of epoxy resin compositions having a calculated glass transition temperature (calculated Tg) of from 0 to 40° C., and (ii) from 10 to 50 wt. %, based on polymer solids, of an alkali soluble polymer shell around the epoxy resin, which polymer shell is the copolymerized product of from 5 to 40 wt. % of methacrylic acid or its anhydride, based on the total weight of monomers copolymerized to form the polymer shell, and the remainder of one or more ethylenically unsaturated comonomer, and (iv) an additive chosen from a divalent metal ion ($M^{2+}$) having a pKa of 9.55 or higher and its strong acid having a pKa of less than 3.5 or organic acid salt having a pH in water of 7.0 or less, wherein the molar ratio of $M^{2+}$ ions to the carboxyl groups from the copolymerized methacrylic acid or its anhydride in the alkali soluble resin shell is from 10 to 200 mole %.

2. The redispersible polymer powder composition as claimed in claim 1, wherein the epoxy resin composition (i) is a blend of two or more epoxy resins.

3. The redispersible polymer powder composition as claimed in claim 1, wherein the calculated Tg of the epoxy resin composition (i) is from 5 to 35° C.

4. The redispersible polymer powder composition as claimed in claim 1, wherein the amount of the epoxy resin composition (i) in the multilayer polymer particle ranges from 60 to 85 wt. %, based on polymer solids.

5. The redispersible polymer powder composition as claimed in claim 1, wherein the alkali soluble polymer that comprises the polymer shell of the multilayer polymer particle has a calculated Tg of from 60° C. to 120° C.

6. The redispersible polymer powder composition as claimed in claim 1, further comprising (iii) from 3 to 25 wt. % of one or more colloidal stabilizer, based on total epoxy resin, alkali soluble polymer and colloidal stabilizer solids.

7. The redispersible polymer powder composition as claimed in claim 1, wherein the divalent metal ion is chosen from calcium, zinc, barium and magnesium.

8. The redispersible polymer powder composition as claimed in any preceding claim 1 wherein the pH of the additive in water is 7.0 or less.

9. A composition comprising cement or hydraulic binder and the redispersible polymer powder composition as claimed in claim 1.

10. A method for making a water dispersible epoxy multilayer polymer particle powder comprising:
mechanically dispersing an epoxy resin in an aqueous medium to form an initial aqueous epoxy resin dispersion;
charging the initial aqueous epoxy resin dispersion into a reaction vessel;
providing in the reaction vessel an ethylenically unsaturated monomer mixture comprising (i) from 5 to 40 wt. % of methacrylic acid or its anhydride and (ii) the remainder of one or more copolymerizable ethylenically unsaturated monomers, each based on the total weight of ethylenically unsaturated monomers copolymerized to form the polymer shell, and one or more addition polymerization catalyst;
copolymerizing the monomer mixture in the presence of the initial aqueous epoxy resin dispersion to form an aqueous multilayer polymer particle dispersion;
adding an additive chosen from a divalent metal ion ($M^{2+}$) having a pKa of 9.55 or higher and its strong acid having a pKa of less than 3.5 or organic acid salt having a pH in water of 7.0 or less to the aqueous multilayer polymer particle dispersion; and,
removing the aqueous phase from the resulting multilayer polymer to obtain a water redispersible epoxy polymer powder having an alkali soluble polymer shell,
wherein the amounts of epoxy resin and unsaturated monomers are selected so that the resulting water redispersible epoxy polymer powder has from 50 to 90 wt. % of epoxy resin, based on total polymer solids.

11. The process as claimed in claim 10, wherein the ethylenically unsaturated monomer mixture is added by gradual addition to the reaction vessel containing the initial aqueous epoxy resin dispersion.

* * * * *